United States Patent
Tullis (10) Patent No.: US 7,866,812 B1
(45) Date of Patent: Jan. 11, 2011

(54) OPTICAL INSERTS FOR GOGGLES OR FACEMASKS

(76) Inventor: Barclay J. Tullis, 1795 Guinda St., Palo Alto, CA (US) 94303-2947

( * ) Notice: Subject to any disclaimer, the term of this patent is extended or adjusted under 35 U.S.C. 154(b) by 0 days.

(21) Appl. No.: 12/325,185

(22) Filed: Nov. 29, 2008

(51) Int. Cl.
*G02C 9/00* (2006.01)

(52) U.S. Cl. .................. 351/47; 351/57; 2/441

(58) Field of Classification Search .......... 351/47, 351/48, 57, 58, 158, 41; 2/441, 445, 13, 2/431, 436, 439
See application file for complete search history.

(56) References Cited

U.S. PATENT DOCUMENTS

| | | | |
|---|---|---|---|
| 4,755,040 | A | 7/1988 | Haslbeck |
| 5,371,555 | A | 12/1994 | Nagel |
| 5,428,407 | A * | 6/1995 | Sheffield ............ 351/58 |
| D372,490 | S | 8/1996 | Sheffield |
| 5,608,470 | A * | 3/1997 | Sheffield ............ 351/47 |
| 6,234,627 | B1 * | 5/2001 | Agnoli ............ 351/47 |
| 6,502,937 | B2 | 1/2003 | Yang |
| 6,749,299 | B1 | 6/2004 | Hsu |
| 6,869,179 | B2 * | 3/2005 | Friedman ............ 351/47 |
| 7,055,951 | B2 | 6/2006 | Canavan |
| D537,098 | S | 2/2007 | Sheldon |
| D537,103 | S | 2/2007 | Sheldon |
| D537,104 | S | 2/2007 | Sheldon |
| 7,204,589 | B2 | 4/2007 | Pieterman |
| 2007/0115424 | A1 | 5/2007 | Froissard |
| 2007/0279577 | A1 | 12/2007 | Stanley |

OTHER PUBLICATIONS

UVEX.pdf (2pages); "Prescription Ski Goggles" by UVEX from Sport Optical; retrieved on Oct. 31, 2008 from http://www.sportoptical.com/.
Diving_Mask-to_Prescription.pdf (2 pages); "SEAC Extreme diving mask" by Sports Vision Plus; retrieved on Oct. 31, 2008 from http://www.sportsgoggles.co.uk/ExtreemDivingMask.asp.
Sea_Vision_Prescription_Swim_Goggles.pdf (10 pages); "Sea Vision Prescription Swim Goggles" from OpticsPlanet.com ; retrieved on Oct. 30, 2008 from http://www.opticsplanet.net/sportrx-sea-vision-prescription-swim-googles-sc10.html.
Revision_Eyewear_Desert_Locust.pdf (3 pages); "Revision Eyewear Desert Locust RX Insert" from Night Optics ; retrieved on Oct. 30, 2008 from http://www.night-optics.com/ts-rm-rx-dl-ins-404299100-rx.html.
Smith_Ocular_Docking_System.pdf (5 ppages); "Smith Ocular Docking System" from Peepers.com; retrieved Nov. 27, 2008 from http://www.peepers.com/sunglass-accessories/other-accessories/smithoculardockingsystem.cfm.

(Continued)

*Primary Examiner*—Hung X Dang
(74) *Attorney, Agent, or Firm*—Novelthink; Barclay J. Tullis (57) ABSTRACT

An optical insert is disclosed for use in a pair of goggles, behind a facemask, or behind other eyewear. The insert is held in place by forces from the goggles, facemask, or other eyewear. These forces include forces directed generally inward against the left and right ends of the insert and a force directed backward against a middle portion of the insert.

21 Claims, 9 Drawing Sheets

OTHER PUBLICATIONS

V2G.pdf (3 pages); "V2G RX1800 RX lens insert" from T.A.S.C.O.; retrieved on Oct. 31, 2008 from http://www.tasco-safety.com/sglasses/sglasses11.html.

Wiley_X_Nerve_Goggles_Prescription_RX_Insert.pdf (6 pages); "Wiley X Nerve Goggles Prescription RX" from Tactical Store; retrieved on Oct. 30, 2008 from http://www.tactical-store.com/ts-wx-rx-nerve.html.

Top_Gun.pdf (2 pages); "Top Gun Safety glasses" from Sports Vision Plus; retrieved on Oct. 31, 2008 from http:www.sportsgoggles.co.uk/TopGunShootingSpectacle.asp.

Wiley_X_CQC_Rx_Prescription_Insert.pdf (1 page); "Wiley X CQC Rx Prescription Insert" from Optics Planet; retrieved on Oct. 30, 2008 from http://www.opticsplanet.net/picture-2-wiley-gg-x-cqc-rx.html.

Adidas_Robin.pdf (2 pages); "Adidas Robin Ski Mask—prescription" from Go Sports Spex; retrieved on Oct. 31, 2008 from http://www.gosportsspex.co.uk/Adidas_Robin_Ski_Mask_AndGoogles.asp.

Allsafe.pdf (2 pages); "Allsafe Revolution Goggle RX Insert" from Safety Glasses USA; retrieved Oct. 31, 2008 from http://safetyglassesusa.com/10505.html?productid=10505&channelid=BIZRA.

ESS.pdf (2 pages); "ESS Advancer V12 Prescription Insert" from Safety Glasses USA; retrieved Oct. 31, 2008 from http://www.safetyglassesusa.com/epprsc-a.html.

Prescription_Insert_Interchangeable_Lens_Goggles.pdf (3 pages); "Spitfires Prescription Insert Goggles—with Prescription Metal Lens Insert" from Maximum Eyewear; retrieved on Oct. 31, 2008 from http://www.maximumeyewear.com/productfolder/motorcycle-glasses/motorcycle-glasses/prescription-goggles/ prescription-goggles.html.

Uvex_XC.pdf (2 pages); "Uvex XC RX Prescription Lens Insert" from Cooper Safety Supply; retrieved on Oct. 31, 2008 from http://www.coopersafety.com/item/100115/Uvex-XC-Rx-Prescription-Lens-Insert.aspx.

Uvex_XC-Additional_Photos.pdf (1 page); "Uvex XC RX Prescription Lens Insert" from Cooper Safety Supply; retrieved on Oct. 31, 2008 from http://www.coopersafety.com/Gallery.aspx?itemid=100115.

RX_Goggles_Order_Prescription_insertion_process.pdf (1 page); "Insertion & Removal" from RX Goggles; retrieved on Oct. 31, 2008 from http://www.888rxgoggles.com/care.html.

RX_Goggles_Order_Prescription.pdf (1 page); "RX Goggles—RX Insert" from RX Goggles; retrieved on Oct. 30, 2008 from http://www.888rxgoggles.com.

Bolle_B.pdf (2 pages); "Bolle Blank RX Adapters, and Instructions how to insert RX adapter" from Optics Planet; retrieved on Oct. 31, 2008 from http://www.opticsplanet.net/bolle-googles-rx-adapter.html.

Bolle.pdf (1 page); "Optical Insert" from Sports Spex; retrieved on Oct. 31, 2008 from http://www.sport-spex.com/Goggles_Bolle_Sharkfin_Black_fade_Vermillion_Gun_Lens.asp.

ESS_Striker_and_Tactical_Series_Goggle_Rx_Insert.pdf (6 pages); "ESS Striker & Tactical Series Goggle Rx Insert" from Optics Planet; retrieved on Oct. 30, 2008 from http://www.opticsplanet.net/ess-striker-rx-insert-rxprescription.html.

Prescription_Sunglasses_Options.pdf (5 pages); "RX Insert Sunglasses" from Heavy Glare; retrieved on Oct. 30, 2008 from http://www.heavyglare.com/Prescription_Sunglasses_Options.php.

Orca_insert.pdf (2 pages); "GOGoggles Diving Mask Insert" from Go Sports Spex; retrieved on Oct. 31, 2008 from http://www.prescriptionswimgoggles.co.uk/GOGogglesPrescriptionDivingMaskinsert.asp.

Orca.pdf (1 page); "Orca Prescription Insert Dive Mask" from Sport Spex; retrieved on Oct. 31, 2008 from http://www.sport-spex.com/Goggles_and_Diving_Masks_Orca_Prescription_Dive_Mask.asp.

Pro-Vue_Lens_System.pdf (5 pages); "Pro-Vue® Snap Lens System" from Pro-Vue; retrieved on Oct. 31, 2008 from http://www.pro-vue.com/snap.html.

Aqua_Sphere-Seal_XP_Swim_Googles-Clear_Lens.pdf (1 page); "Seal XP™ Swim Goggle" from Aqua Sphere; retrieved on Oct. 30, 2008 from http://www.aquaphereswim.com/us/products/sealxp_clr_trans.html.

* cited by examiner

OPTICAL INSERTS FOR GOGGLES OR FACEMASKS

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

1. Field of the Invention

This invention relates to inserts for vision improvement when used in goggles or facemasks.

2. Description of the Related Art

Many examples of prior-art eyewear such as safety glasses, face shields, facemasks, goggles, sunglasses, and spectacles have been provided with additional vision aids such as prescription lenses, spectral filters, polarizers, and/or other optical elements to protect, enhance, or otherwise alter a wearer's vision. Some of this prior-art eyewear has these vision aids integrated permanently as components within the eyewear, and some as removable from the eyewear only by using removal tools. However, some others of this prior-art eyewear use optical inserts (i.e. inserts with vision aids) that can be easily installed or removed without tools. Nevertheless, there has been no means of providing wearers of certain low-profile, wrap-around goggles with additional vision aids (such as optical inserts with corrective lenses).

One product implements prescription lenses as integral parts of the window/lens of a pair of ski goggles and is shown on the Internet webpage at the URL address of http://www.sportoptical.com/.

Another product implements corrective lenses as integral portions of the window (or as lenses glued into place to the inside of a flat window) of a dive mask that has a single window for both eyes and is shown on the Internet webpage at the URL address of http://www.sportsgoggles.co.uk/ExtreemDivingMask.asp.

One example of prior-art eyewear is swim goggles for racing, such as disclosed in U.S. Pat. No. 4,755,040. These goggles are constructed with two integral windows that position respectively in front of a wearer's two eyes, with a respective seal positioned around each eye. They can also be constructed with one single window that is positioned in front of both of a wearer's eyes, with a single face-seal around both eyes. Whereas U.S. Pat. No. 4,755,040 doesn't disclose the use of corrective lenses integrated as part of goggles for correcting a wearer's vision, goggles that have corrective left-eye and right-eye lenses with respective seals do exist; these goggles are available with plus or minus spherical optical powers up to an absolute value of 12 diopters and plus or minus cylindrical optical powers up to an absolute value of 4 diopters. An example of these goggles with corrective lenses is found on the Internet webpage having the following URL address: http://www.opticsplanet.net/sportrx-sea-vision-prescription-swim-goggles-sc10.html.

Many prior-art inserts are mounted to a compatible attachment device which is part of the eyewear and located near the nose region of the eyewear. Examples include U.S. Pat. Nos. 6,502,937 and 7,204,589; U.S. Patent Application Publication Nos. 2007/0115424 and 2007/0279577; and U.S. Design Pat. Nos. 372,490, D537,103, and D537,104. Other examples include those inserts shown as products on Internet webpages at the following URL addresses:

http://www.night-optics.com/ts-rm-rx-dl-ins-404299100-rx.html,
http://www.peepers.com/sunglass-accessories/otheraccessories/smithoculardockingsystem.cfm,
http://www.tasco-safety.com/sglasses/sglasses11.html,
http://www.tactical-store.com/ts-wx-rx-nerve.html,
http://www.sportsgoggles.co.uk/TopGunShootingSpectacle.asp,
http://www.opticsplanet.net/picture-2-wiley-gg-x-cqc-rx.html,
http://www.gosportsspex.co.uk/Adidas_Robin_Ski_Mask_AndGoggle.asp,
http://safetyglassesusa.com/10505.html?productid=10505&channelid=BIZRA,
http://www.safetyglassesusa.com/epprsc-a.html, and
http://www.maximumeyewear.com/productfolder/motorcycle-glasses/motorcycle-glasses/prescription-goggles/prescription-goggles.html.

Other prior-art inserts are mounted to compatible attachment or mounting devices within the goggles and located both at the nose region of the eyewear and at locations to the left of the left lens and to the right of the right lens. Examples include U.S. Pat. Nos. 6,749,299 and 7,055,951. Other examples include those inserts shown as products on Internet webpages at the following URL addresses:

http://www.coopersafety.com/item/100115/Uvex-XC-Rx-Prescription-Lens-Insert.aspx, and
http://www.coopersafety.com/Gallery.aspx?itemid=100115.

Inserts having structural members that extend upward, downward, leftward, and/or rightward to become trapped and held by layered structural elements of goggles or (in some cases) facemasks include products shown on Internet webpages at the following URL addresses:

http://www.888rxgoggles.com/care.html,
http://www.888rxgoggles.com,
http://www.opticsplanet.net/bolle-goggles-rx-adapter.html,
http://www.sport-spex.com/Goggles_Bolle_Sharkfin_Black_fade_Vermillion_Gun_Lens.asp,
http://www.opticsplanet.net/ess-striker-rx-insert-rxprescription.html, and
http://www.heavyglare.com/Prescription_Sunglasses_Options.php.

One prior-art insert product has a rigid frame that is generally flat and mounts to a flat-windowed facemask by employing forward-extending standoffs at each of the right and left ends of the frame of the insert, such that the frame (and the entire insert) becomes spaced apart from the inner window surface of the facemask, and such that the frame ends with their standoffs lodge within the left and right ends of the facemask. This insert is not curved leftward or rightward and does not contact the facemask near a nose region. This insert is shown as a product on Internet webpages at the following URL addresses:

http://www.prescriptionswimgoggles.co.uk/GOGoggle-sPrescriptionDivingMaskinsert.asp, and
http://www.sport-spex.com/Goggles_and_Diving_Masks_Orca_Prescription_Dive_Mask.asp.

U.S. Pat. No. 5,371,555 discloses an insert that can be used within goggles that have a single window and a single face-seal. In this reference, the insert is mounted to attachment holders such as pegs installed near the left and right ends of the goggles, and the entire insert is spaced apart from the window ("outer lens") of the goggles.

One prior art mounts a tinted lens, though not an insert, to the outside of goggles by means of external attachment devices located near the left and right ends of the eyewear. A product of this description is shown on the Internet webpage at the following URL address: http://www.pro-vue.com/snap.html.

One example of prior-art eyewear of a wrap-around style is that shown in U.S. Design Pat. No. D537,098. This design patent shows a pair of goggles having separate left-eye and right-eye lenses positioned generally within the lines-of-sight of a wearer of the goggles, along with a single face-seal instead of individual seals around each of a wearer's eyes. Although no mention is made of how to provide such goggles with an insert, the drawings would seem to suggest that an insert can be used by mounting it to the nose-bridge region where there appears to be a slot provided on either side of the nose-bridge region to accommodate nose-pad supporting wires from an inserted frame holding spectacle lenses. Because of the presents of venting holes (as seen in FIGS. 1, 3-6 of that design patent), this goggle type spaces the goggle windows far enough from the wearer's eyes that there may be ample room within for an optical insert as well as structural elements with which to hold the insert in place.

Of particular interest is another example of prior-art eyewear that is a low-profile, wrap-around style of swim goggles as shown on the Internet webpage having the following URL address: http://www.aquaphereswim.com/us/products/sealxp_clr_trans.html. These particular goggles have two separate windows (one for each eye) and a single face-seal. These are called "low-profile" not only because the windows (also called lenses) of a pair of these goggles are curved to generally follow (i.e. wrap-around) the curved contour of a wearer's face in the wearer's left and right directions, but also because the windows/lenses of the goggles position very closely to a wearer's face. Both of these features, wrap-around windows and a low profile, result in less drag of the goggles through the water compared to larger goggles. But a problem with low-profile, wrap-around goggles, which have either two individual windows mounted within a single frame that is attached to a single face-seal, or which have one single window mounted within a single frame that is attached to a single face-seal, is that the prior art has not included a way to enable a wearer of such goggles to also use corrective lenses other than contact lenses. Reasons for this have been largely because of a) the difficulty of customizing corrective lenses as part of a curved window (or as components to be bonded to a curved window), b) the minimal amount of space within such goggles to contain and hold both an optical insert and corresponding mounting apparatus with which to mount an insert, and c) the apparent lack of structural features of the goggles to which an insert or insert-mounting hardware could be mounted or otherwise attached.

What is needed is a) to recognize a need to provide wearer's of low-profile, wrap-around goggles with means to use corrective lenses (or other visual aids) within such goggles; b) to provide an optical insert comprising corrective lenses or other vision aids that can be successfully and effectively used within such goggles; and c) to provide means for mounting an optical insert (i.e. an insert) within such goggles. It would furthermore be most advantageous if the means for mounting an insert within such goggles does not require structural elements (of the insert or of its means of mounting) that would interfere with comfortable and effective use of the goggles.

BRIEF SUMMARY OF THE INVENTION

Apparatus and method embodiments of the current invention recognize the need to provide low-profile, wrap-around goggles with corrective lenses and/or other vision aids, and provide solutions to meet this need. Embodiments of the current invention include means for mounting an insert within goggles of the low-profile, wrap-around type and those similarly structured, without having the insert or the structure of the means for mounting the insert interfere with comfortable and effective use of the goggles. Embodiments of the current invention can apply not only to goggles but to other eyewear as well; therefore the term "goggles" or "pair of goggles" used in this disclosure starting with the previous paragraph, and within the claims, should be taken to mean any eyewear that could benefit by the addition of an optical insert.

The invention is pointed out with particularity in the appended claims. However, some aspects of the invention are summarized herein.

According to one aspect of the present invention, an optical insert to hold at least one corrective lens inside of a pair of goggles comprises: a) at least one lens having at least one optical center and b) a frame that contains the lens and a fastener-free middle portion; wherein the frame has a front side that faces outward from a wearer's face; wherein the frame has a left end, a right end, and a frame center in between; wherein any offset distance of the one optical center from the frame center is not adjustable by the wearer; and wherein the shapes of the left end and the right end are each arcuate and convex as viewed along a perpendicular to the front side.

According to another aspect of the present invention, an insert to position at least one corrective lens inside of a pair of goggles comprises a) left and right retention ears which are substantially convex and arcuate outwardly and separated by a substantially fixed distance; and b) a fastener-free and non-extendable middle portion of the insert; wherein the insert is configured such that the goggles squeeze the insert between said left and right retention ears causing the middle portion of the insert to push outward against a fastener-free middle portion of the goggles.

According to another aspect of the present invention, an insert for goggles comprises a) at least one lens; b) a frame to locate said at least one lens for use by a wearer of the goggles; c) left and right retention ears for partial support of said insert within the goggles; and d) a middle portion of said frame configured for pressing outward against a fastener-free middle portion of said goggles; wherein outer ends of the retention ears are substantially convex and arcuate; and wherein said frame and said lens have a structural relationship to one another that remains fixed.

According to another aspect of the invention, a method of making an insert for use in a pair of goggles comprises: a) specifying and fixing an inter-pupil distance; and b) making a frame that is inclusive of left and right retention ears having convex and arcuate ends; wherein said frame is configured to find support inside of said pair of goggles from forces applied by said pair of goggles to said left and right retention ears and against a fastener-free middle location of said frame.

According to another aspect of the invention, a method of adding vision-improvement to a pair of goggles comprises: a) obtaining an insert that comprises at least one vision-improvement lens, both left and right retention ears, and a fastener-free middle portion of said insert; and b) squeezing said insert into the inside of said goggles, wherein said left and right retention ears push against left and right cavities respectively of said goggles, whereby said insert is caused to press forward against a middle portion of said goggles.

According to another aspect of the invention, an insert to hold at least one corrective lens within a pair of goggles comprises: a) at least one retention ear that is itself adjustable; and b) means for mounting by left and right cavities inside of said pair of goggles and against a middle portion of said pair of goggles.

OBJECTS AND ADVANTAGES OF THE INVENTION

The present invention was motivated originally by the fact that the eyewear industry has not been able to come up with a satisfactory solution for swimmers having poor eyesight and needing corrective eyewear to see their way on approach and departure to/from bodies of water to swim in, and when swimming to see what obstacles are in their path through the water, to see lane-lines at the bottom of a pool, or to see an approaching wall. Many pool safety rules demand that a swimmer not bring a glass-faced dive mask into a pool. Furthermore, plastic swim goggles having independent lens cups that seal around each eye independently of one-another (and are attached to one-another by a nose-bridging strap that can cut into a wearer's nose) are mass-produced with limited steps in corrective optical powers, but more importantly often either seal inadequately around each eye socket or need to press so tightly against the region of a wearer's eye socket that they leave (although usually temporary) rings around the wearer's eyes, or they even bruise the tissue about the eyes.

Whereas dive masks that have flat windows can be fitted with corrective lenses adhered to the inside of the window, these lenses are often too far from the wearer's face for successful vision correction over a wide field of view without requiring large lens apertures that are totally impractical for wearer's having strong prescriptions for their corrective lenses. Furthermore, the flat window of a dive mask prevents incorporating cylindrical curvatures for astigmatic corrections onto the surface of a corrective lens that is to be adhered to the flat inner surface of that window, and this makes such corrections impractically expensive or simply not possible. It is also impractical to design corrective lenses with forward-surface curvatures matching the curvature of the window(s) of wrap-around goggles to enable the corrective lenses to be adhered to the inner surface of those window(s).

Inserts, on the other hand, have been used that hold standard eyeglass lenses within a frame that can be mounted within a dive mask having a flat window. These frames are much like standard eyeglass frames only with the nose pads, temple arms, and temple hinges removed. These frames and their corrective lenses are examples of what are called inserts and are typically not designed to touch the bridge or sides of one's nose. These inserts that fit within a dive mask can sometimes be fit within ski goggles and other eye-wear, but they will generally not fit within low-profile, wrap-around swim goggles. To fit within such goggles, inserts would generally require smaller-diameter lenses and at least their frame structure would need to be curved to at least approximately match the curvature of the window(s) of the goggles. Furthermore, a suitable means would be required with which to hold (i.e. to mount) the insert within the tight space within low-profile, wrap-around goggles.

What is needed for providing corrective lenses within low-profile, wrap-around goggles (particularly those with curved lenses, but also goggles with a single curved window, or any eyewear worn closely to the curvature of a face) is a similarly curved insert, and not one that will interfere with proper fit of the goggles (or other eyewear) to the wearer's face, particularly not causing a bridge of the insert between the lenses of the insert to touch both the wearer and the eyewear.

This invention provides a goggle insert that will automatically adapt to the contour of goggles with a single curved window or with two curved (left side and right side) windows. Because the corrective lenses of the insert are located closer to the wearer's eyes than with regular spectacles, the corrective lenses can be of smaller diameter than with regular spectacles. And the frame of the insert can snap into place within the goggles with the bridge of the frame pressing away from the wearer's face and up against the inside of the goggles in the region of the bridge. The current invention provides such an insert as one embodiment of the invention.

Further advantages and embodiments of the present invention will become apparent to ones skilled in the art upon examination of the drawings and detailed description. It is intended that any additional advantages and embodiments be incorporated herein.

The various features of the present invention and its preferred embodiments may be better understood by referring to the following discussion and the accompanying drawings. The contents of the following discussion and the drawings are set forth as examples only and should not be understood to represent limitations upon the scope of the present invention.

BRIEF DESCRIPTION OF THE SEVERAL VIEWS OF THE DRAWINGS

The foregoing objects and advantages of the present invention for an insert for goggles or a facemask may be more readily understood by one skilled in the art with reference being had to the following detailed description of several embodiments thereof, taken in conjunction with the accompanying drawings. Within these drawings, callouts using like reference numerals refer to like elements in the several figures (also called views), alphabetic-letter-suffixes where used help to identify modifications of a part or feature related to alternative embodiments, a single or double prime can denote a part or feature that has been made or manipulated into a different state or shape relative to a part or feature having an un-primed callout. Within these drawings.

DETAILED DESCRIPTION OF THE INVENTION

The following is a detailed description of the invention and some of its preferred embodiments as illustrated in the drawings. Within the disclosure of the present invention and what is claimed, an insert (also called an optical insert) is defined to be an optical aid that is usable within a pair of goggles (or within a facemask) and, more narrowly than in the prior-art, that has no structure for touching the sides of a user's nose to achieve support or alignment in front of a user's eyes. While the invention will be described in connection with the drawings, there is no intent to limit it to the embodiment or embodiments disclosed. On the contrary, the intent is to cover all alternatives, modifications and equivalents included within the spirit and scope of the invention as defined by the appended claims.

Figure 1A:
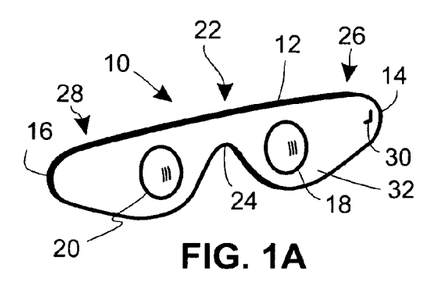
FIG. 1A is a perspective view of the front of an insert complete with lenses.

FIG. 1A is a perspective view of the front of an insert 10 complete with lenses. The insert 10 shown represents one embodiment of the present invention. It shows a frame 32 retaining a left lens 18 and a right lens 20 which lenses together comprise a pair of lenses 18 & 20. Directions of left and right and up and down are taken to be from the point-of-view of a user (i.e. wearer) of a subject insert (also of a user of a subject pair of goggles). Note that in this view, what is left and right from the point of view of someone using the insert to correct their vision is opposite to what is left and right from the view of the perspective shown in this figure. The frame 32 includes an upper edge 12, a left end 14, a right end 16, a left retaining ear 26, and a right retaining ear 28. From the orientation of someone using the insert 10 to correct their vision, the left retaining ear (or left wing) 26 extends to the left of the left lens 18; the right retaining ear (or right wing) 28 extends to the right of the right lens 20. The two lenses are situated to either side of a middle portion 22. A nose-bridge 24 leaves clearance for a user's nose. An orientation mark 30 is optional and used by a user to correctly identify what is left and what is right. The orientation mark 30 illustrated here would appear as having the shape of the letter "L" if viewed from a user's side of the insert 10. In this embodiment, the frame 32 is shown to be generally flat in a state with no external forces applied to it. Also in this embodiment, the frame 32 is shown to have no protruding or recessed attachment devices other than a) a flat area on the front of the middle portion 22 and b) the protruding retention ears 26 & 28 at the ends 14 & 16. In this embodiment, the frame 32 is thin and preferably transparent. The frame 32 of this embodiment can be made from a plastic material such as polycarbonate. The lenses 18 & 20 can be a molded portion of the insert 10, or they can be separate components (plastic or glass) held in place by conventional means. One example of a conventional means is that of a force-fit for each lens, the force fit made possible by having a convex edge around each of the lenses 18 & 20 fit into a respective groove defining the apertures 34 & 36 shown in FIG. 1B.

Figure 1B:
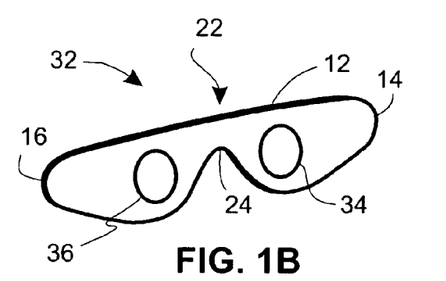
FIG. 1B is a perspective view of the front of a frame portion of an insert.

FIG. 1B is a perspective view of the front of a frame 32 as might be used to construct an insert (such as the insert 10 shown in FIG. 1A). Lenses 18 & 20 (shown in FIG. 1A) are not present in this view, as left lens aperture 34 and a right lens aperture 36 are shown for receiving lenses 18 & 20. The optional orientation mark 30 shown in FIG. 1A is also not shown. Lenses 18 & 20 (as shown in FIG. 1A) can be made as separate components for installation within apertures 34 & 36 for this frame 32 as they would not be integrally made parts of the frame 32 shown in this view.

Figure 2:
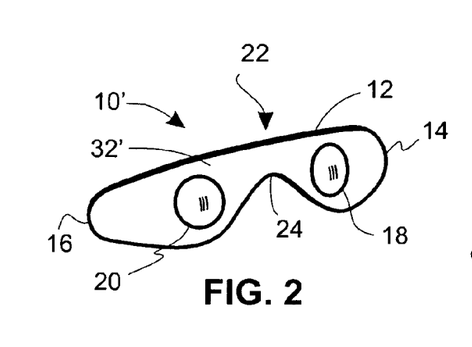
FIG. 2 is a perspective view of the front of an insert in a state showing concave curvature.

FIG. 2 is a perspective view of the front of a concavely curved insert 10'. The insert 10' represents the insert 10 shown in FIG. 1A but elastically bent. The optional orientation mark 30 shown in FIG. 1A is not shown here. The insert 10' as shown in this view may alternatively represent an insert that has this concave shape in a relaxed state as it would be with no external forces applied to it. In either case, the shape shown for insert 10' is the shape that it would have after being installed within a pair of goggles and with its frame 32' concavely curved. Note that the flat area in the middle portion 22 shown in FIG. 1A is instead curved in this view with the insert concavely curved.

Figure 3:
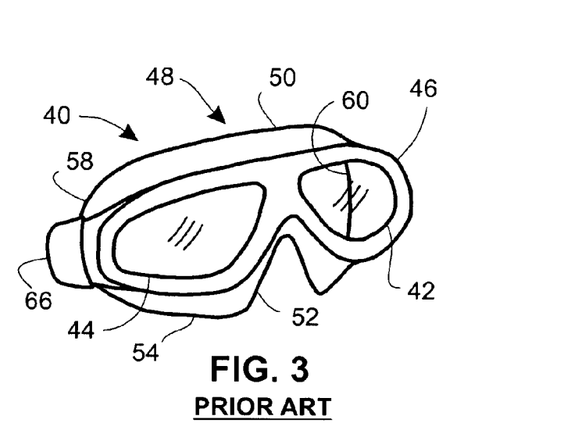
FIG. 3 is a perspective view of the front of a pair of goggles.

FIG. 3 is a perspective view of the front of a pair of goggles 40, illustrative of low-profile, wrap-around swim goggles according to prior art. A left lens 42 of the goggles 40 and a right lens 44 of the goggles 40 are shown surrounded by a goggle frame 46 that is connected to a face-seal 48 of the goggles 40. The face-seal 48 of the goggles 40 include edge regions that are for sealing out water from entering space behind the goggle lenses 42 and 44. The edge regions include a forehead region 50, a nose region 52, two cheek regions 54, a left-temple region 56 (see FIG. 6), and a right-temple region

58. Visible in this perspective is a left fold 60 in the face-seal 48, and a right strap anchor 66. A right fold 62 and a left strap anchor 64 are visible in FIGS. 5-8 and some of the other figures. Note that the left temple region 56 (see FIGS. 5 & 6) of the face-seal 48 is hidden in this view by the left fold 60 in the face-seal 48.

Figure 4:
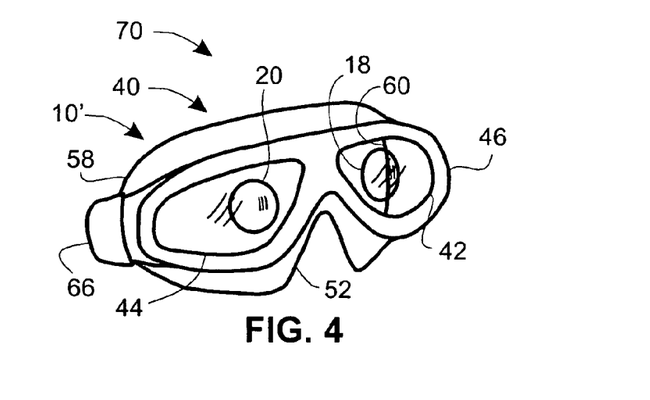
FIG. 4 is a perspective view of the front of a pair of goggles with an insert installed.

FIG. 4 is a perspective view of the front of a pair of goggles 40 with an insert 10' installed within the goggles. The insert lenses 18 & 20 can be seen behind the goggle lenses 42 & 44 respectively. The insert 10' is held within the goggles 40 by having the left retention ear 26 tucked between the left fold 60 and the frame 46, and the right retention ear 28 tucked between the right fold 62 and the frame 46. This combination of goggles 40 and an insert 10' comprises one example embodiment of a pair of vision-correcting goggles 70 using an insert 10' according to the present invention.

Figure 5:
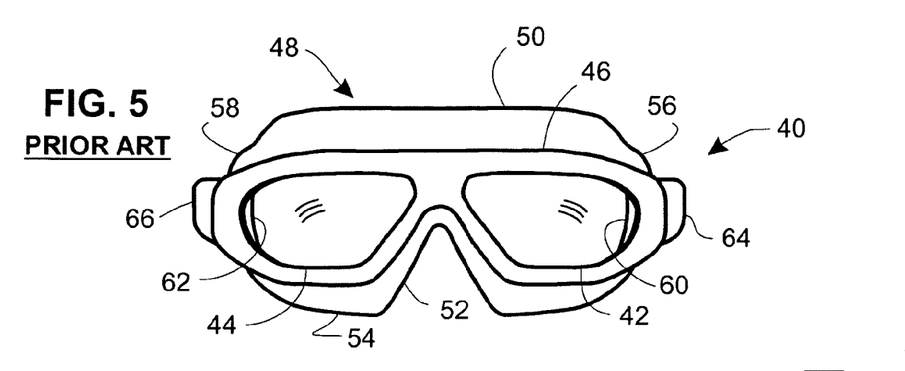
FIG. 5 is a front view of a pair of goggles.

FIG. 5 is a front view of the pair of low-profile, wrap-around swim goggles 40 described above in discussing FIG. 3. However, in this view the left-temple region 56 of the face-seal 48 is visible, as is the right fold 62 in the face-seal 48, and the left strap anchor 64. Portions of the left and right folds 60 & 62 of the face-seal 48 are visible behind the left and right goggle lenses 42 & 44 respectively.

Figure 6:
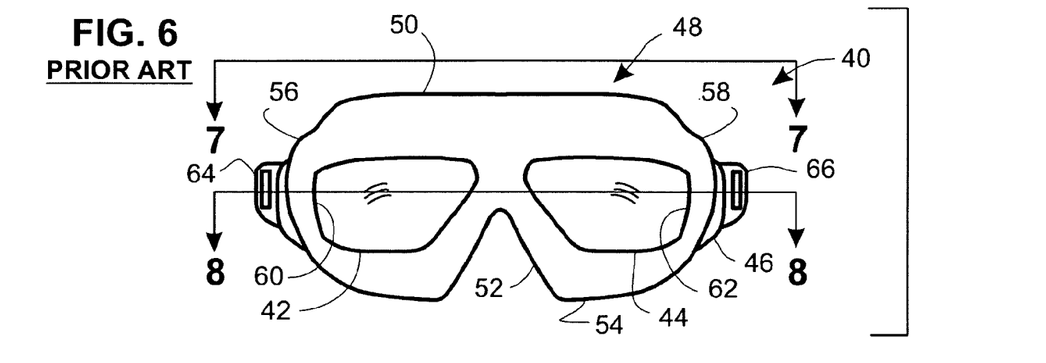
FIG. 6 is a rear view of a pair of goggles.

FIG. 6 is a rear view of the pair of goggles 40. View indicators 7-7 and 8-8 show the perspectives taken for the FIGS. 7 and 8 discussed in the next two paragraphs.

Figure 7:
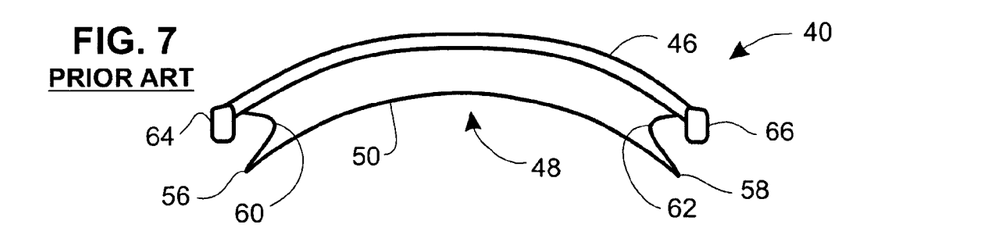
FIG. 7 is a top view of a pair of goggles.

FIG. 7 is a top view of the pair of goggles 40 as indicated in FIG. 6. This view shows how the left and right folds 60 & 62 in the face-seal 48 provide for a soft touch of the left and right temple regions 56 & 58 of the face-seal 48 to the left and right sides of a user's face.

Figure 8:
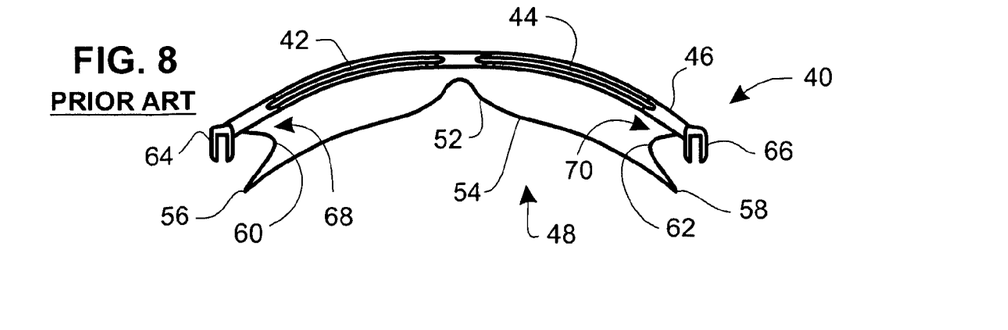
FIG. 8 is a sectional view of a pair of goggles as viewed from the top.

FIG. 8 is a sectional view of the pair of goggles 40 as indicated in FIG. 6. In addition to providing a good view of the left and right folds 60 & 62, this view shows a left cavity 68 and a right cavity 70 formed between the folds 60 & 62 respectively and the frame 46.

Figure 9:
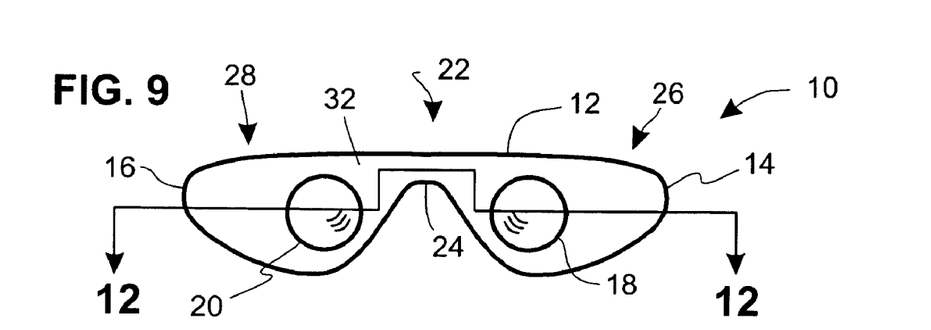
FIG. 9 is a front view of an insert.
Figure 12:
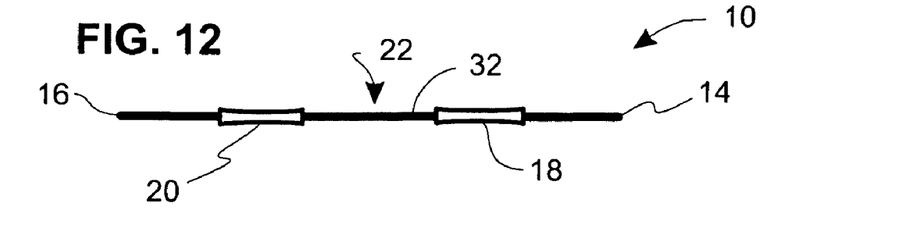
FIG. 12 is a sectional view of an insert viewed from the top.

FIG. 9 is a front view of the insert 10. The left end 14 of the insert 10 is also the left end 14 of the frame 32 and the left end 14 of the left retention ear 26. The right end 16 of the insert 10 is also the right end 16 of the frame 32 and the right end 16 of the right retention ear 28. Also shown below an upper edge 12 and to either side of a middle portion 22 and a nose-bridge 24 are a left lens 18 and a right lens 20 (left and right from a wearer's perspective behind the insert 10). The sectional view direction 12-12 for the view in FIG. 12 is also indicated. The lenses 18 & 20 in this embodiment of the invention may, for example, be lenses having a spherical curvature on either their front or back surfaces, may have an added cylindrical curvature on a side opposite that of one with a spherical curvature, or may have a more complex curvature on front and/or back sides. The lenses 18 & 20 in this embodiment of the invention may, for example, be prescription lenses or selected from an incremental list of optical powers. As is well known in the art, lenses for correcting vision each have an optical center, and the distance between optical centers of a left and a right lens is known as their pupillary distance (PD) and should generally be specified and accommodated in the manufacture of eye-wear. Thus the frame 32 of an insert 10 should be made with a PD consistent with the inter-pupil distance of a wearer (i.e. a specific user, or a generic class of users of the insert 10). This embodiment shown of the insert 10 also illustrates that the lenses 18 & 20 may be smaller (in aperture size) than those of regular spectacles since low-profile, wrap-around goggles will place such inserts more closely to a wearer's eyes than regular spectacles do. The resulting closeness is a huge advantage for wearers having a very strong prescription in that a smaller aperture size translates directly to a thinner lens and thus avoids possible physical interferences that thicker lenses could cause within the confines of the goggles, i.e. between a wearer's face (and eyes) and the goggles themselves.

Figure 10:
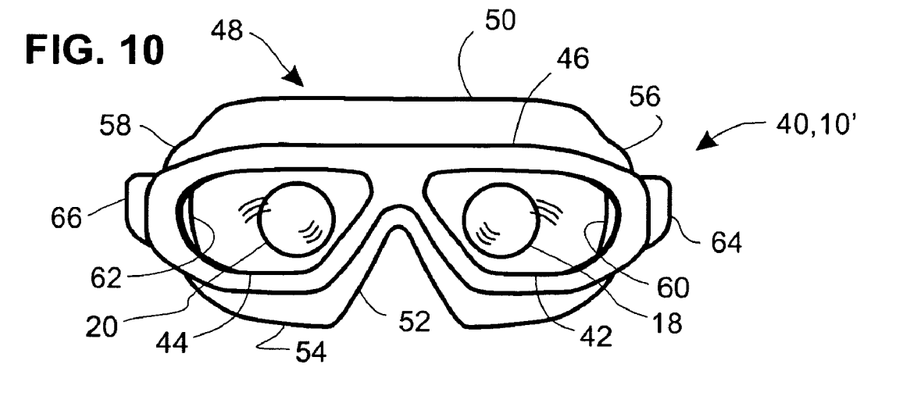
FIG. 10 is a front view of a pair of goggles with an insert installed.

FIG. 10 is a front view of a pair of goggles 40 with an insert 10' installed. Note that the insert 10', at least as installed, is concavely curved and therefore curved in the same direction as the lenses 42 and 44 of the goggles 40. This curvature will be more clearly seen in FIG. 15 and its discussion below. In this front view, the insert 10' with its lenses 18 & 20 is behind the frame 32 and goggle lenses 42 & 44, but in front of the folds 60 & 62 in the face-seal 48.

Figure 11:
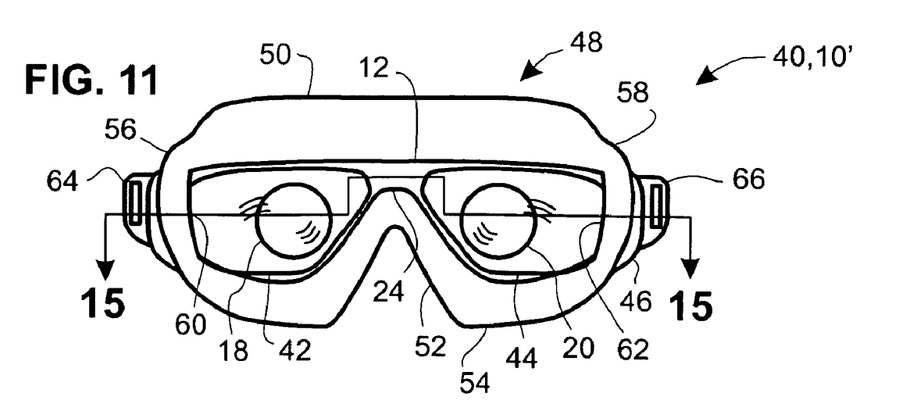
FIG. 11 is a rear view of a pair of goggles with an insert installed.
Figure 15:
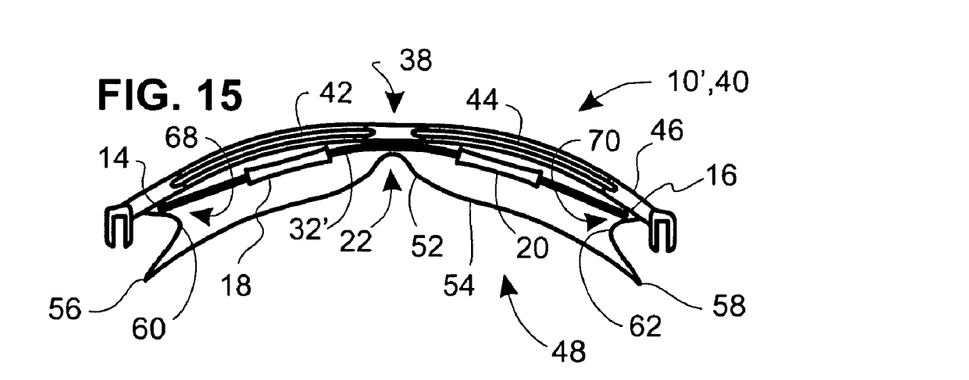
FIG. 15 is a sectional view from the top of a pair of goggles showing a concavely curved insert fully installed.

FIG. 11 is a rear view of the pair of goggles 40 with the insert 10' installed that was shown with a view from the front in FIG. 10. The sectional view direction 15-15 for the view in FIG. 15 is also indicated.

FIG. 12 is a sectional view of an insert 10 viewed from the top as indicated in FIG. 9.

Figure 13:
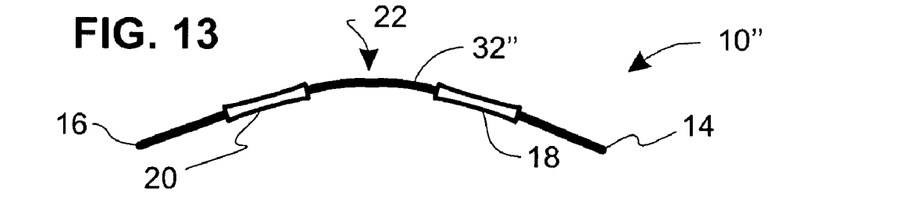
FIG. 13 is a sectional view of a convexly curved insert viewed from the top.

FIG. 13 is a sectional view of a convexly curved flexible insert 10" viewed from the top. This view is that which would result by taking the sectional view shown in FIG. 12 and, if the frame 32 shown in FIG. 9 is flexible, bending the insert 10 shown in FIG. 9 into the curvature shown here, a curvature that is opposite that which the insert 10' has when installation is complete as shown in FIG. 15 (and in FIGS. 2, 4, 10, and 11). Note that the convexly curved insert 10" transforms into the concavely curved insert 10' during the installation process for a flexible insert. If the frame 32' of an insert 10' (as shown in FIG. 2) is substantially rigid in its concavely curved shape, instead of flexible, then it wouldn't be bent into a convexly curved shape during installation but can be inserted into the goggles 40 by temporarily flexing the folds 60 & 62 of the face-seal 48 outwards from the middle portion 22 and possibly also flexing the goggles 40 temporarily into a less concaved shape than they are when absent of applied external forces.

Figure 14:
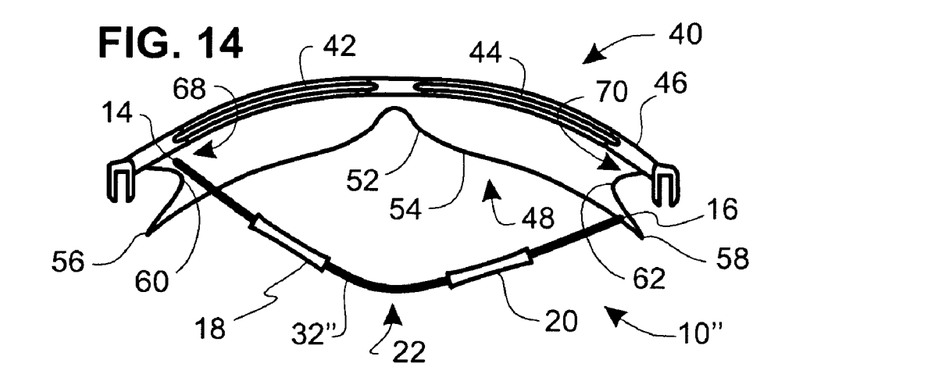
FIG. 14 is a sectional view from the top of a pair of goggles showing a convexly curved insert partially inserted.

FIG. 14 is a sectional view from the top of a pair of goggles 40 showing a convexly curved insert 10" partially inserted. The sectional view of the goggles 40 is identical to that shown in FIG. 8 as sectioned from FIG. 6. The sectional view of the convexly curved insert 10" is that of FIG. 13 but where the insert has been rotated 180 degrees about an axis perpendicular to the page. What is shown is a step involved in installing a flexible insert 10" within the goggles 40, wherein the left end 14 of the insert 10" is first inserted within the left cavity 68 of the goggles 40, i.e. inserted between the left fold 60 of the face-seal 48 and the goggle frame 46.

FIG. 15 is a sectional view from the top of a pair of goggles 40 showing a concavely curved insert 10' fully installed. The fully installed insert 10' is also shown in FIG. 11 where this view is defined. The insert 10' can have a frame 32' that is either flexible or substantially rigid. As already discussed in the paragraphs above, an insert 10' having a rigid frame 32' that is concave can be installed by manipulating the folds 60 & 62 out of the way temporarily to allow the ends 14 & 16 of the insert 10' to be positioned within the respective cavities 68 & 70. If the flexible insert 10 of FIG. 1 is to be installed, or if the insert 10' of FIG. 2 is to be installed and has a flexible frame, then it can be installed by first bending the insert into a convex configuration 10" as shown in FIG. 13 and installed by then inserting one end 14 or 16 into a respective cavity 60 or 62 followed by inserting the other end into the other cavity, and then pushing the middle portion 22 of the insert toward the front of the goggles 40 until the insert transforms to one having a concave curvature. Note however that a flexible insert 10 that is normally flat, or a flexible insert 10' that has a concave configuration, can alternatively be inserted in the same manner as one that is rigid.

Once an insert 10' (flexible or rigid) is properly in place after being installed within the goggles 40 as illustrated in FIG. 15, the insert 10' should remain mounted (i.e. supported) securely within the goggles 40. The means of mounting (i.e. the means of support) is effected by a) the middle portion 22 of the insert 10' pressing forward against a middle portion 38 of the goggles 40, while the middle portion 38 exerts a counter-force backward (toward the insert) against the middle portion 22; and b) the ends 14 & 16 of the insert 10' pressing outward against the cavities 68 & 70 of the goggles 40, while the cavities 68 & 70 exert counter-forces inward (toward the middle portions 22 & 38) against the ends 14 & 16.

FIG. 15 demonstrates to one skilled the art that the insert 10' is possessed with means for mounting within a pair of goggles 40, afforded by its left and right retention ears 14 & 16 and its middle portion 22. The structure of the "means for mounting" is any structure which is sufficient for supporting the insert 10' within the goggles 40 by contacting the goggles 40 in such a way that the insert 10' becomes bound by left and right cavities 68 & 70 and by a middle portion 38 of the goggles 40 that touches the middle portion 22 of the insert 10'. Inserts according to the present invention (such as illustrated in FIGS. 1A, 1B, 2, 4, 9-33) have means for mounting and do not have or require devices such as hooks or screws or mounting brackets in order to be supported within goggles. These figures show that the middle portion 22 of each insert is fastener-free, as is the middle portion 38 of the goggles shown in other figures.

The illustration of FIG. 15 also shows that there is space between the left lens 18 of the insert 10' and the left lens 42 of the goggles 40, and space between the right lens 20 of the insert 10' and the right lens 44 of the goggles 40, spaces that enables water to be flushed between the two sets of lenses in order to rinse them.

Figure 16:
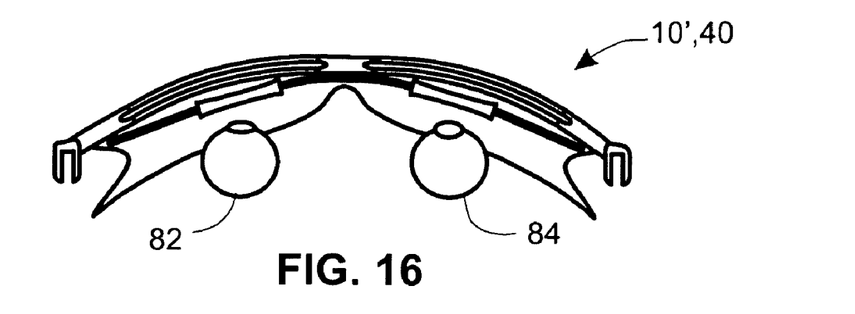
FIG. 16 is identical to FIG. 15 but also showing the location of a wearer's eyes.

FIG. 16 is identical to FIG. 15 but also shows the approximate location of a wearer's eyes, both a left eye 82 and a right eye 84.

Figure 17:
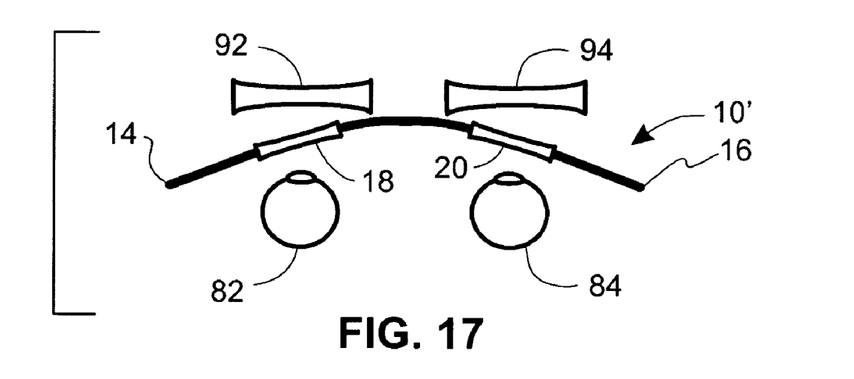
FIG. 17 shows an insert located closer to a wearer's eyes than lenses in an ordinary pair of spectacles as normally worn.

FIG. 17 shows an insert 10' located relative to a wearer's eyes as shown in FIG. 16. Also shown are spectacle lenses 92 & 94 located relative to the wearer's eyes as they might be positioned by an ordinary pair of spectacles. This figure helps to visualize the fact that the clear aperture sizes of the lenses 18 & 20 of the insert 10' can be smaller than those of the spectacle lenses 92 & 94 and provide the wearer an equivalent field of view. As mentioned in the discussion above, smaller lenses mean that the lenses 18 & 20 can be made thinner for any given optical correcting power, and thus inserts according to the present invention enable the use of vision-correcting lenses that are less likely to interfere mechanically with the goggles of the wearer's face when squeezed into the small confines of a pair of wrap-around, low profile goggles. For strong optical prescriptions, the prescription of lenses 18 & 20 may need to take into account the shorter-than-normal distance between the goggle wearer's eyes and the lenses 18 & 20. Also for strong optical prescriptions, the tilt of the lenses 18 & 20 shown relative to the wearer's forward view can be avoided by choosing a different frame shape as is discussed below in the discussions of FIGS. 25-27.

Figure 18:
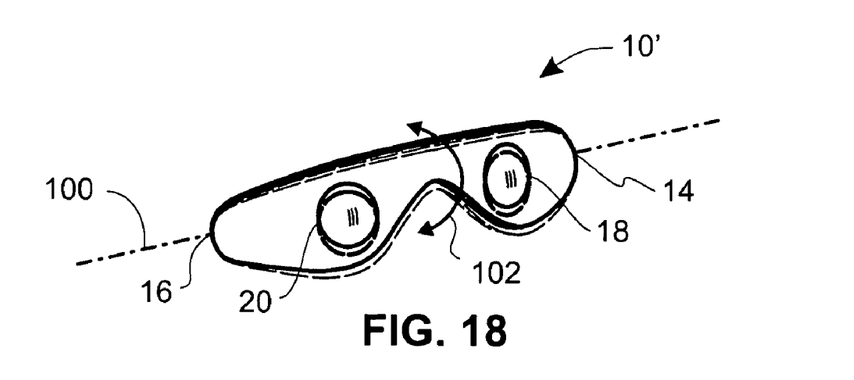
FIG. 18 shows a perspective front view of an insert in two adjustable orientations about an axis through the left and right ends of the insert.

FIG. 18 shows a perspective front view of an insert 10' in two of possibly many adjustable orientations about an axis 100 through the left and right ends 14 & 16 of the insert 10'. The two orientation positions are depicted one with a solid line and the other with a dashed line. As installed within a pair of goggles 40 (as shown in FIGS. 4, 10, 11, and 15), the insert 10' is supported within the goggles 40 by its two ends 14 & 16 and force from the goggles 40 applied against the middle portion 22 of the insert 10'. Such a support allows the insert 10' to be adjusted in the rotational directions 102 indicated in this view. That is, a wearer of goggles 40 can adjust the elevation of the lenses 18 & 20 relative to the lenses 42 & 44 of the goggles 40.

Figure 19:
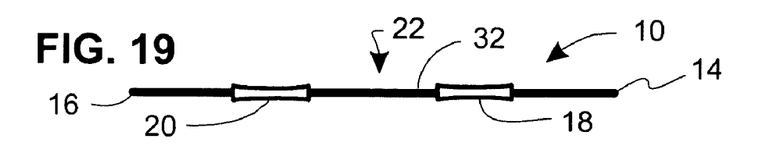
FIG. 19 is a sectional view of an insert viewed from the top (identical to that shown in FIG. 12).
Figure 20:
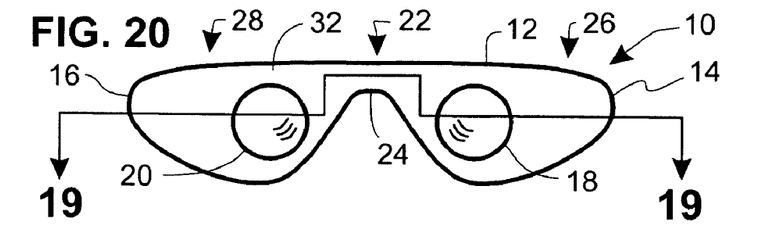
FIG. 20 is a front view of an insert (identical to that shown in FIG. 9).

FIG. 19 is a sectional view of the insert 10 (with frame 32) viewed from the top (identical to that shown in FIG. 12 and sectioned from FIG. 9). FIG. 20 is a front view of the insert 10 (identical to that shown in FIG. 9) (with frame 32). These two views in FIGS. 19 & 20 of insert 10 are provided here for convenient visual comparison with insert 10a (having frame 32a) shown in FIGS. 21 & 22 below.

Figure 21:
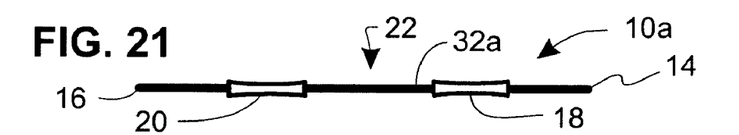
FIG. 21 is a sectional view of an insert viewed from the top (showing shorter ears than those on the insert in FIG. 19).
Figure 22:
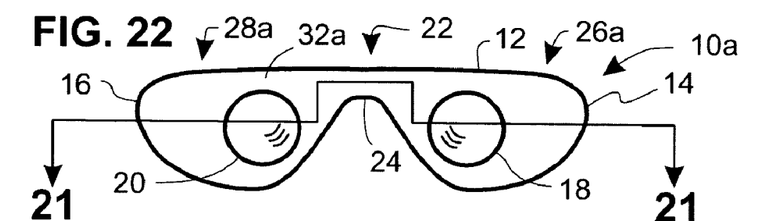
FIG. 22 is a front view of an insert (showing shorter ears than those on the insert in FIG. 20).

FIG. 21 is a sectional view of an insert 10a (with frame 32a) viewed from the top (showing shorter left and right retention ears 26a & 28a than those 26 & 28 of the insert 10 in FIG. 19). FIG. 22 is a front view of the insert 10a (with frame 32a) (showing shorter left and right retention ears 26a & 28a than those 26 & 28 of the insert 10 in FIG. 20).

Regarding FIGS. 19-22, one skilled in the art can readily observe and appreciate that the embodiment of insert 10a (with frame 32a) has shorter left and right retention ears 26a & 28a than insert 10 (with frame 32 and left and right retention ears 26 & 28). This comparison illustrates that inserts 10 and 10a can be made with retention ears selected, or adjusted in overall width from left end to right end, to suitably fit goggles of different sizes. Such adjustment can be accomplished, for example, by selecting from multiple design choices for the left-right width of the insert (or width of the frame) or by trimming material from the left and right ends 14 & 16.

Figure 23:
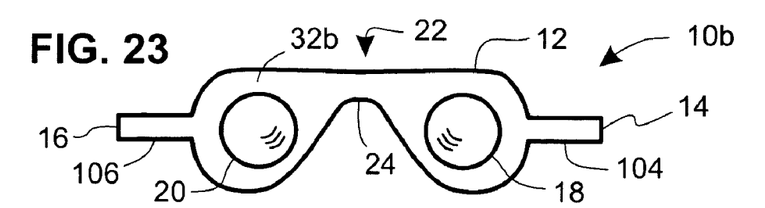
FIG. 23 is a front view of an insert showing ears that are shaped as rectangular tabs.

Showing another embodiment, FIG. 23 is a front view of an insert 10b (with frame 32b) showing left and right ears 104 & 106 that are shaped as tabs to make it easy for a user to trim their lengths and thus accommodate differently sized goggles. A variation of this would be left and right ears 104 & 106 that operate as spring-loaded pistons providing automatic adjustment to different goggle widths.

Figure 24:
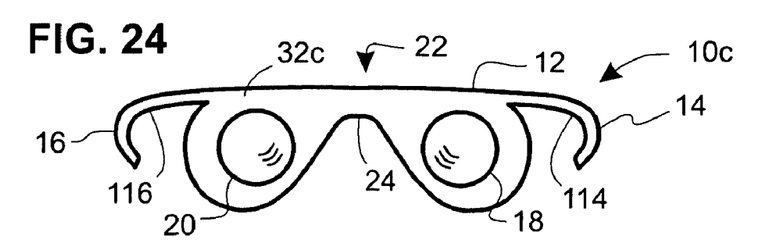
FIG. 24 is a front view of an insert showing ears that are shaped as curved hooks.

Showing another embodiment, FIG. 24 is a front view of an insert 10c (with frame 32c) showing left and right ears 114 & 116 that are shaped with a curvature that allows them to function as elastic members that can extend and contract in the left-right directions in order to accommodate a range of different sizes of goggles by automatically adjusting width between the left end 14 and the right end 16.

Figure 25:
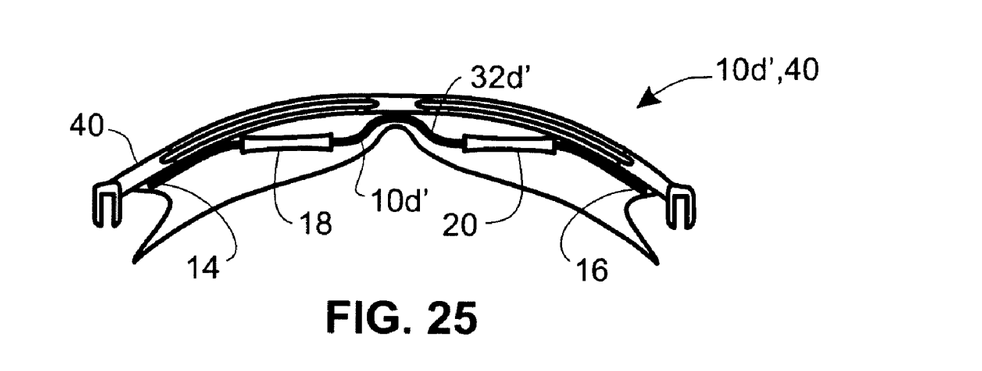
FIG. 25 is a sectional view from the top showing a pair of goggles with an insert installed that is shaped to orient lenses perpendicular to a wearer's forward line of sight.

Showing another embodiment, FIG. 25 is a sectional view from the top showing a pair of goggles 40 with an insert 10d' (with frame 32d') installed. The insert 10d' is shaped to orient lenses more nearly perpendicular to a wearer's forward line of sight. The sectional view of the goggles 40 is identical to that shown in FIG. 8 as sectioned from FIG. 6. The sectioning perspective of the insert 10d' is similar to that used to generate FIG. 12 from the insert 10 in FIG. 9.

Figure 26:
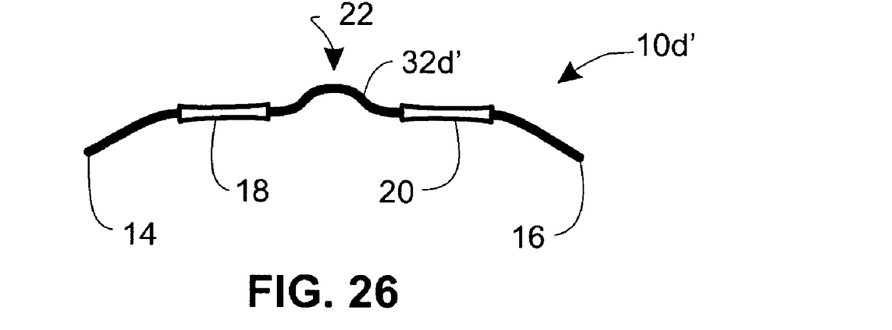
FIG. 26 is a sectional view from the top of the insert shown in FIG. 25.

FIG. 26 is a sectional view from the top of the insert 10d' shown in FIG. 25. This insert 10d' may either have the shape illustrated here when free of external forces, or may have an alternative shape (shown in FIG. 27) when free of external forces. The later shape would need to be elastically bent into the shape shown here in order to be captured within the goggles 40.

Figure 27:
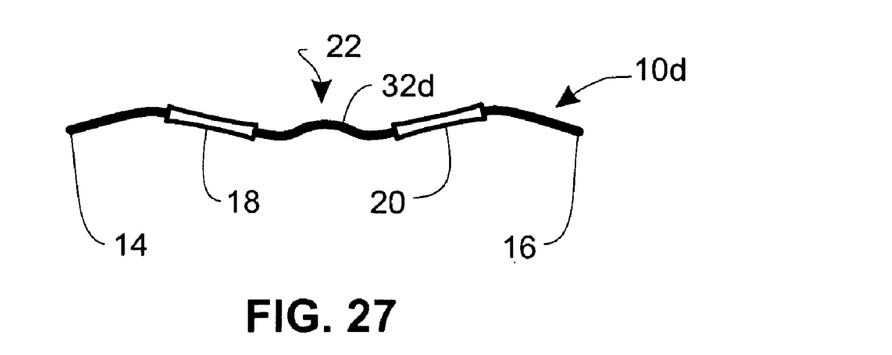
FIG. 27 is a sectional view from the top of the insert shown in FIG. 26, but in a relaxed state.

FIG. 27 is a sectional view from the top of an insert 10d (with frame 32d) as it would appear when free of external forces, i.e. in a relaxed state. When bent into more of a concave shape, this insert 10d becomes an insert 10d' as shown in FIG. 25.

Figure 28:
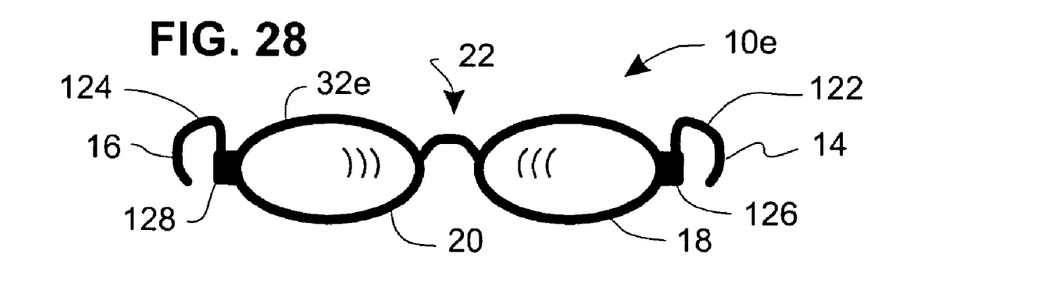
FIG. 28 is a front view of an insert with a frame constructed mostly of wire-like elements.

Showing yet another embodiment, FIG. 28 is a front view of an insert 10e with a frame 32e constructed mostly of wire-like elements. The frame 32e holds a left lens 18 and a right lens 20 to either side of a middle portion 22. Left-end and right-end fixed connections 124 & 126 connect the left and right retention ears 122 & 124 respectively to the rest of the frame 32e. Being fixed connections 124 & 126, these connections 124 & 126 do not, in one embodiment, have a hinging action. The insert 10e would be held within goggles 40 much the same as shown for insert 10 (as shown in FIG. 15). Insert 10e could be either permanently bent into a concave shape, or elastically bent into a concave shape, and held within goggles 40 by forces applied by the goggles 40 on the ends 14 & 16 and on the middle portion 22 (as similarly done with insert 10' shown in FIG. 15).

Figure 29:
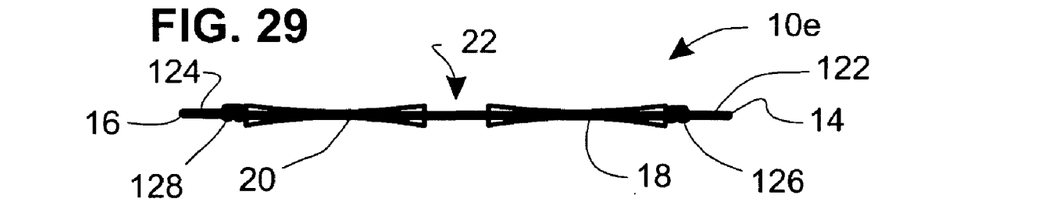
FIG. 29 is a top view of the insert shown in FIG. 28.

FIG. 29 is a top view of the insert 10e shown in FIG. 28.

Figure 30:
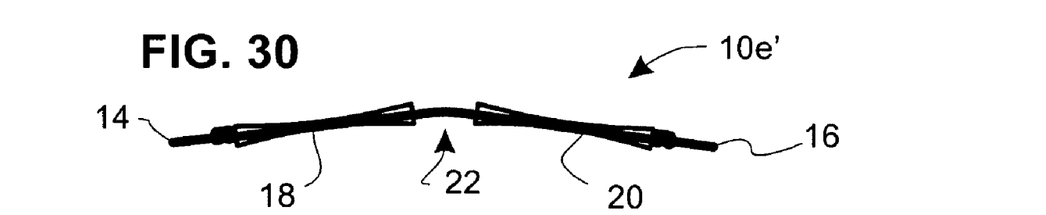
FIG. 30 is a top view of the insert shown in FIG. 29 but bent at the middle section.

FIG. 30 is a top view of an alternative insert 10e' achieved by bending the middle portion 22 of the insert 10e shown in FIG. 29.

Figure 31:
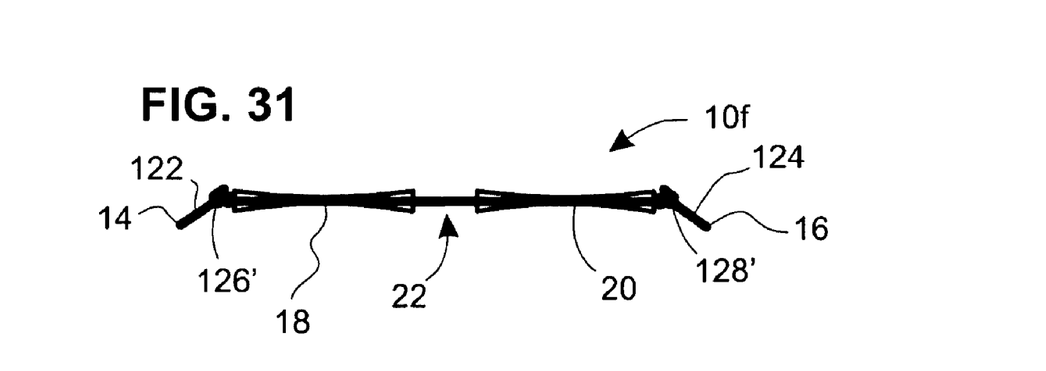
FIG. 31 is a top view of an insert similar to that shown in FIG. 29 but having hinged ears.

FIG. 31 is a top view of another alternative insert 10f similar to that shown in FIG. 29 but having hinged retention ears 122 & 124, hinged by the left-end hinge 126' and the right-end hinge 128'. The left-end and right-end hinges 126' and 128' are made to hinge only between the two locations much as shown in FIGS. 30 and 31 to impart the approximately concave curvatures as shown.

Figure 32:
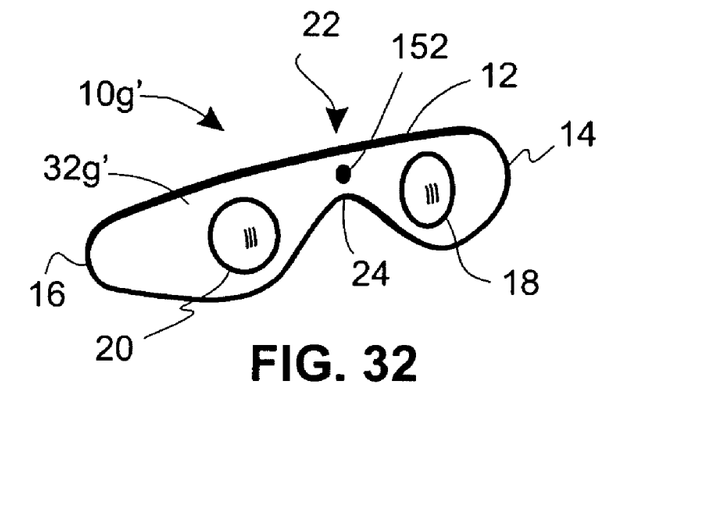
FIG. 32 is a perspective front view of an insert similar to that shown in FIG. 1A but having a standoff element at the front of its middle section.

FIG. 32 is a perspective front view of an insert 10g' (with frame 32g') similar to the insert 10 shown in FIG. 1A, but having a standoff element 152 at the front of its middle section 22. This standoff element 152 can be used to adjust the distance the middle portion 22 of the insert 10g' stands off from the inner surface of the goggles toward a wearer's face above the nose.

Figure 33:
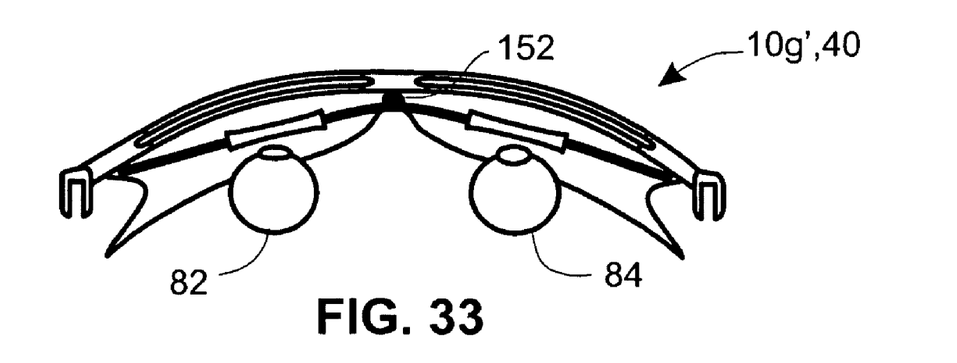
FIG. 33 is a sectional view from the top, similar to FIG. 16, showing a pair of goggles with the insert of FIG. 32 installed.

FIG. 33 is a sectional view from the top, similar to FIG. 16, showing a pair of goggles 40 with the insert 10g' of FIG. 32 installed.

One skilled in the art will appreciate that other structure for "means for mounting" can be used. Some examples would be inserts that bend or flex mostly within limited portions of an insert frame, inserts that are rigid and not intended for bending, and inserts that contact the inside of a pair of goggles in such a way as to bind the insert between side regions of the goggles and one or more regions nearer the middle portion or nose region. Such alternative embodiments for "means for mounting" are considered herein to be included within equivalents of "means for mounting".

One skilled in the art will also appreciate that it is within the scope and spirit of the current invention to include embodiments of an optical insert and its means for mounting that don't require the insert to directly contact the goggles within the left and right cavities, but rather employ some intermediate object configured to nest within those cavities and accommodates the left and right ends of an insert respectively.

Although specific embodiments have been illustrated and described herein, those of ordinary skill in the art will appreciate that any arrangement configured to achieve a similar purpose may be substituted for the specific embodiments shown. This disclosure is intended to cover any and all adaptations or variations of various embodiments of the invention. One such example would be the variation of an insert having an adjustable inter-pupil distance. Another such example would be provided an insert with vents for easier cleaning, venting, and/or draining. It is to be understood that the above description has been made in an illustrative fashion, and not a restrictive one. Combinations of the above embodiments, and other embodiments not specifically described herein will be apparent to those of skill in the art upon reviewing the above description. The scope of various embodiments of the invention includes any other applications in which the above structures and methods are used. Therefore, the scope of various embodiments of the invention should be determined with reference to the appended claims, along with the full range of equivalents to which such claims are entitled. Where the claims mention "goggles" or "pair of goggles", it is to be understood that what is meant is any eyewear that could benefit by the addition of an optical insert.

I claim:

1. An optical insert to hold at least one corrective lens inside of a pair of goggles, the insert comprising:
   a. at least one lens having at least one optical center; and
   b. a frame that contains the lens and a fastener-free middle portion;
   wherein the frame has a front side that faces outward from a wearer's face;
   wherein the frame has a left end, a right end, and a frame center in between;
   wherein any offset distance of the one optical center from the frame center is not adjustable by the wearer; and
   wherein the shapes of the left end and the right end are each arcuate and convex as viewed along a perpendicular to the front side.

2. The insert of claim 1, wherein the lens is one of the group including bi-focal and tri-focal.

3. The insert of claim 1, wherein the lens is less than 2 cm in diameter.

4. The insert of claim 1, wherein the lens is molded integrally with the frame.

5. The insert of claim 1 wherein at least a portion of the frame is transparent.

6. The insert of claim 5 wherein the frame is flexible.

7. The insert of claim 5 wherein the frame is rigid and concave.

8. The insert of claim 1 wherein at least one of said left end and right end is a retention ear.

9. The insert of claim 8, wherein said retention ear is adjustable.

10. An insert to position at least one corrective lens inside of a pair of goggles, the insert comprising:
    a. left and right retention ears which are substantially convex and arcuate outwardly and separated by a substantially fixed distance; and
    b. a fastener-free and non-extendable middle portion of the insert;
    wherein the insert is configured such that the goggles squeeze the insert between said left and right retention ears causing the middle portion of the insert to push outward against a fastener-free middle portion of the goggles.

11. The insert of claim 10 further comprising a frame that is flexible.

12. The insert of claim 10 further comprising a frame that is rigid and concave.

13. An insert for goggles, the insert comprising:
    a. at least one lens;
    b. a frame to locate said at least one lens for use by a wearer of the goggles;
    c. left and right retention ears for partial support of said insert within the goggles; and
    d. a middle portion of said frame configured for pressing outward against a fastener-free middle portion of said goggles;
    wherein outer ends of the retention ears are substantially convex and arcuate; and
    wherein said frame and said lens have a structural relationship to one another that remains fixed.

14. The insert of claim 13, wherein the frame is flexible.

15. The insert of claim 13, wherein the frame is rigid and concave.

16. A method of making an insert for use in a pair of goggles, the method comprising:
   a. specifying and fixing an inter-pupil distance; and
   b. making a frame that is inclusive of left and right retention ears having convex and arcuate ends;
   wherein said frame is configured to find support inside of said pair of goggles from forces applied by said pair of goggles to said left and right retention ears and against a fastener-free middle location of said frame.

17. The method of claim 16 further comprising including at least one lens within the frame.

18. The method of claim 16 further comprising flexing the insert during installation into the goggles.

19. The method of claim 16 further comprising installing the insert within the pair of goggles.

20. A method of adding vision-improvement to a pair of goggles, the method comprising:
   a. obtaining an insert that comprises at least one vision-improvement lens, both left and right retention ears, and a fastener-free middle portion of said insert; and
   b. squeezing said insert into the inside of said goggles, wherein said left and right retention ears push against left and right cavities respectively of said goggles, whereby said insert is caused to press forward against a middle portion of said goggles.

21. An insert to hold at least one corrective lens within a pair of goggles, the insert comprising:
   a. at least one retention ear that is itself adjustable; and
   b. means for mounting by left and right cavities inside of said pair of goggles and against a middle portion of said pair of goggles.

* * * * *